(12) United States Patent
Anderson et al.

(10) Patent No.: US 12,023,976 B2
(45) Date of Patent: Jul. 2, 2024

(54) VEHICLE HAVING A LATERALLY ADJUSTABLE CHASSIS AND METHODS OF SERVICING SUCH A VEHICLE

(71) Applicant: AGCO Corporation, Duluth, GA (US)

(72) Inventors: Joseph Paul Anderson, Spirit Lake, IA (US); James McGrath Slawson, Spirit Lake, IA (US); Todd Brandon Snyder, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 3 days.

(21) Appl. No.: 17/817,377

(22) Filed: Aug. 4, 2022

(65) Prior Publication Data
US 2023/0047073 A1 Feb. 16, 2023

Related U.S. Application Data

(60) Provisional application No. 63/260,110, filed on Aug. 10, 2021.

(51) Int. Cl.
*B60G 17/016* (2006.01)
*B60G 17/04* (2006.01)

(52) U.S. Cl.
CPC .......... *B60G 17/016* (2013.01); *B60G 17/04* (2013.01)

(58) Field of Classification Search
CPC .... B60G 17/016; B60G 17/04; B60G 15/067; B60G 9/02; B60G 15/068; B60G 9/022; B60G 9/00; B60G 2200/314; B60G 2200/341; B60G 2204/43; B60G 2204/128; B62D 7/20
See application file for complete search history.

(56) References Cited

U.S. PATENT DOCUMENTS

| 3,652,101 A | * | 3/1972 | Pivonka | B60G 17/01925 |
| | | | | 280/6.154 |
| 6,371,237 B1 | * | 4/2002 | Schaffer | B62D 7/06 |
| | | | | 280/124.17 |
| 7,300,064 B2 | * | 11/2007 | Johnson | B60G 9/00 |
| | | | | 280/124.106 |
| 7,390,000 B2 | * | 6/2008 | Lee | B60G 9/00 |
| | | | | 280/124.111 |

(Continued)

FOREIGN PATENT DOCUMENTS

| EP | 3406125 B1 | * | 11/2020 | .......... A01B 51/023 |
| WO | 9426630 A1 | | 11/1994 | |

OTHER PUBLICATIONS

European Patent Office, International Search Report related to International Patent Application No. EP 22180220, mail date Nov. 18, 2022.

(Continued)

*Primary Examiner* — Toan C To

(57) ABSTRACT

A vehicle includes a chassis, ground-engaging elements configured to support the chassis, support assemblies supporting the chassis on the ground-engaging elements, adjustable axles configured to change a lateral distance from the chassis to each of the support assemblies, and a controller configured to move the chassis laterally along the axles without changing a track width between ground-engaging elements on opposing sides of the chassis. Disclosed methods may be used to remove and install application systems on the vehicle.

18 Claims, 14 Drawing Sheets

(56) References Cited

U.S. PATENT DOCUMENTS

| | | | |
|---|---|---|---|
| 8,042,817 B2* | 10/2011 | Motebennur | B62D 49/0678 |
| | | | 280/6.154 |
| 9,096,261 B2* | 8/2015 | Aldrich | B60G 9/00 |
| 9,180,747 B2 | 11/2015 | Slawson | |
| 10,226,965 B1* | 3/2019 | Schwalbe | B60B 35/1036 |
| 10,266,051 B1* | 4/2019 | Trowbridge | A01M 7/0082 |
| 10,368,473 B2* | 8/2019 | Treinen | A01M 7/0082 |
| 10,427,483 B1* | 10/2019 | Aldrich | B60G 9/00 |
| 10,517,285 B2* | 12/2019 | Crowley | B60G 3/01 |
| 2002/0047303 A1* | 4/2002 | Hosotani | B60G 9/00 |
| | | | 301/125 |
| 2006/0170176 A1 | 8/2006 | Wubben et al. | |
| 2011/0148053 A1* | 6/2011 | Motebennur | B62D 49/0678 |
| | | | 280/6.16 |
| 2012/0318588 A1* | 12/2012 | Kroese | B60G 7/008 |
| | | | 180/41 |
| 2014/0306415 A1* | 10/2014 | Aldrich | B60G 15/067 |
| | | | 280/124.116 |
| 2020/0130741 A1 | 4/2020 | Crowley et al. | |

OTHER PUBLICATIONS

UK Intellectual Property Office, Search report for related UK Application No. GB2111808.8, dated Dec. 31, 2021.

\* cited by examiner

VEHICLE HAVING A LATERALLY ADJUSTABLE CHASSIS AND METHODS OF SERVICING SUCH A VEHICLE

CROSS-REFERENCE TO RELATED APPLICATION

This application claims the benefit of the filing date of U.S. Provisional Patent Application 63/260,110, "Vehicle Having a Laterally Adjustable Chassis and Methods of Servicing Such a Vehicle," filed Aug. 10, 2021, the entire disclosure of which is incorporated herein by reference.

FIELD

Embodiments of the present disclosure relate to mobile machines, such as self-propelled agricultural machines and similar vehicles. More particularly, embodiments relate to mobile machines with an adjustable track width.

BACKGROUND

Some vehicles are configured to be operated in fields among row crops. Application machines such as self-propelled sprayers, for example, may have wheels configured to pass between crop rows and a spray boom that extends outwardly from the vehicle to spray the crop as the machine travels through the field. To avoid damaging the crops as the vehicle moves through the field, each of the wheels must have the proper width to travel between the rows, and the track width—the lateral distance between the wheels—must match row spacing so that the wheels are properly positioned between crop rows. Furthermore, the vehicle should have sufficient ground clearance (the distance between the vehicle body and the surface over which it moves) to clear the crops.

U.S. Pat. No. 9,180,747, "System and Method of Adjusting the Chassis Height of a Machine," granted Nov. 10, 2015, discloses a self-propelled sprayer having a chassis-height adjustment system wherein four wheel support assemblies are configured to selectively raise and lower the chassis relative to the ground surface by actuators. Adjustment of the chassis height in such known systems is commanded by an operator through user interface elements. The operator may thus raise and lower the chassis as required. For example, during filling, on the highway, or in crop fields with short crops, a low ground clearance may be selected. Conversely, for operating in taller crops, a higher ground clearance may be selected. In general, during operation in crop fields, selecting the lowest possible chassis height that avoids damaging the crop canopy is desirable to maintain the center of mass as low as possible for stability.

Self-propelled sprayers that can have the application systems changed for different seasons or different types of application require the operator to use a crane, hoist, forklift, or other lifting device to maneuver the application system on and off the sprayer chassis. Furthermore, depending on the configuration of the lifting device, the operator may need to carefully align the vehicle with the lifting device. The process can be time-consuming if the operator does not have the appropriate equipment and/or workers needed for this task. It is also cumbersome to move the application systems (e.g., with a forklift) because they are large and heavy.

BRIEF SUMMARY

In some embodiments, a method of servicing a vehicle is disclosed. The vehicle includes a chassis, a plurality of ground-engaging elements configured to support the chassis above a ground surface, and a plurality of support assemblies supporting the chassis on the ground-engaging elements. The method includes laterally translating the chassis relative to the support assemblies without changing a track width of the ground-engaging elements.

In another embodiment, a method of servicing a vehicle is disclosed. The vehicle includes a chassis, a plurality of ground-engaging elements configured to support the chassis above a ground surface, and a plurality of height-adjustable support assemblies supporting the chassis on the ground-engaging elements. The method includes supporting a first application system with a first fixed support, retracting the support assemblies to lower the chassis, moving the chassis from a position under the first application system to another position under a second application system supported by a second fixed support, extending the support assemblies to raise the chassis into contact with the second application system, securing the second application system to the chassis, and releasing the second application system from the second fixed support.

In one embodiment, a vehicle includes a chassis, a plurality of ground-engaging elements configured to support the chassis above a ground surface, a plurality of support assemblies supporting the chassis on the ground-engaging elements, a plurality of adjustable axles configured to change a lateral distance from the chassis to each of the support assemblies, and a controller configured to move the chassis laterally along the axles without changing a track width between ground-engaging elements on opposing sides of the chassis.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

Figure 1:
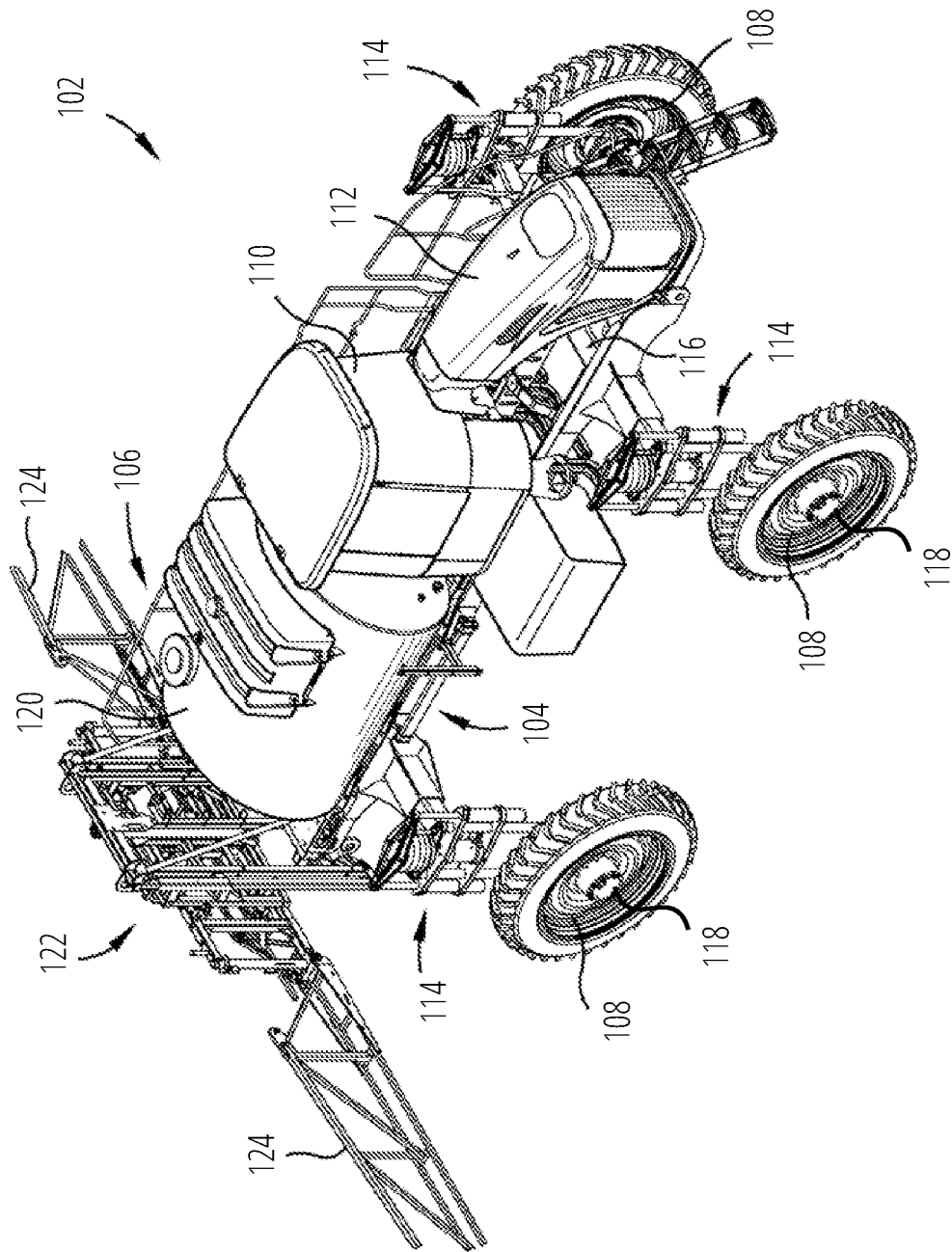
FIG. 1 is a perspective view of an agricultural applicator constructed and operable in accordance with principles disclosed herein.

The illustrations presented herein are not actual views of any vehicle or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates a vehicle 102 having an adjustable track width and chassis height. In particular, the vehicle 102 is pictured as an agricultural material applicator including a chassis 104, an application system 106, a plurality of wheels 108 or other ground-engaging elements supporting the chassis 104 above a ground surface, an operator cabin 110, and an engine compartment 112. A plurality of support assemblies 114 interposed between the wheels 108 and the chassis 104 support the chassis 104 on the wheels 108 and provide suspension, height adjustment, and/or steering functions, as discussed in greater detail below.

Certain components of the vehicle 102 have been omitted from the figures for simplicity of illustration and to show certain features of the vehicle 102 that would otherwise be concealed. The engine, for example, has been omitted to illustrate components of the vehicle frame, including portions of the front axle 116. Certain hydraulic lines, such as hydraulic lines running to and from the support assemblies 114, are also omitted. The vehicle 102 is illustrated and discussed herein as an exemplary machine with which the support assemblies 114 may be used. It will be appreciated by those skilled in the art that such support assemblies 114 may be used with other machines including other types of applicators or other vehicles or mobile machines that would benefit from the advantages disclosed herein, such as chassis height adjustment, independent suspension, track width adjustment, and independent wheel control.

The vehicle 102 includes a pair of front wheels 108 and a pair of rear wheels 108 (one rear wheel 108 hidden from view) of the appropriate size and shape to allow the vehicle 102 to travel among row crops with minimal crop disturbance. A used herein, a "wheel" includes an inner, rigid wheel and an outer, flexible tire mounted on the inner wheel, unless otherwise specified. Each wheel 108 may exhibit, for example, an outer diameter of between 60 inches (152 cm) and 85 inches (216 cm) and a width of between 10 inches (25.3 cm) and 25 inches (63.5 cm). More specifically, wheels 108 designed for use with row crops may exhibit an outer diameter of about 70 inches (178 cm) or about 80 inches (203 cm) and a width of about 15 inches (38.1 cm). Alternatively, the wheels 108 may exhibit a width of up to 25 inches (63.5 cm) (or more) for pre-emergent applications, for use on soft terrain, or both to maximize flotation and minimize soil compaction. Each of the wheels 108 may weigh between 600 pounds (272 kg) and 1,000 pounds (454 kg) and may specifically weigh about 700 pounds (318 kg) or about 800 pounds (363 kg). In one exemplary embodiment, each of the wheels 108 is about 70 inches (178 cm) tall, about 15 inches (38.1 cm) wide, and weighs about 700 pounds (318 kg).

The particular size, shape, and configuration of the wheels 108 may vary substantially from one embodiment to another. In some embodiments, the vehicle 102 may include ground-engaging elements other than wheels, such as tracks, skis, etc. Hereinafter, reference will be made to a "wheel 108" or "wheels 108" with the understanding that the illustrated wheels 108 may be replaced with other types of ground-engaging elements.

The application system 106 is supported on the chassis 104 and may be useful for distributing liquids or solids. In the illustrated embodiment, the application system 106 includes a liquid holding tank 120 and a delivery system 122 for applying a liquid from the liquid holding tank 120 to a crop or field. The liquid holding tank 120 may have a capacity of between 200 gallons (757 l) and 2,000 gallons (7,570 l) and, more specifically, may have a capacity of 700 gallons (2,650 l), 900 gallons (3,410 l), 1,100 gallons (4,160 l), or 1,300 gallons (4,920 l). The delivery system 122 includes a laterally extending applicator boom 124 supporting hoses, pumps, and spray nozzles or similar components for dispersing or otherwise delivering the contents of the liquid holding tank 120 to a crop. Alternatively, the application system 106 may be configured to apply dry (i.e., solid) particulate material to a field and therefore may include a solid product hopper and a solid material spreader for dispersing particulate material from the solid product hopper, such as a pneumatic spreader or one or more spinners.

The operator cabin 110 or "cab" is supported on the chassis 104 and positioned forward of the application system 106. The operator cabin 110 presents a control environment 202, illustrated in FIG. 2, which may include a steering wheel 204, one or more pedals 206, a drive lever 208, one or more electronic instrument panels 210, and a control panel 212 including buttons, switches, levers, gauges, and/or other user interface elements. The various components of the control environment 202 enable the operator to control the functions of the vehicle 102, including driving and operating the application system 106. The various user interface elements are positioned around and proximate a seat 214 for easy access by an operator during operation of the vehicle 102. The control environment 202 may include a touch-screen display. One or both of the electronic instrument panels 210, for example, may be or include a touchscreen, or a display terminal with a touchscreen may be mounted on or near the control panel 212.

Figure 2:
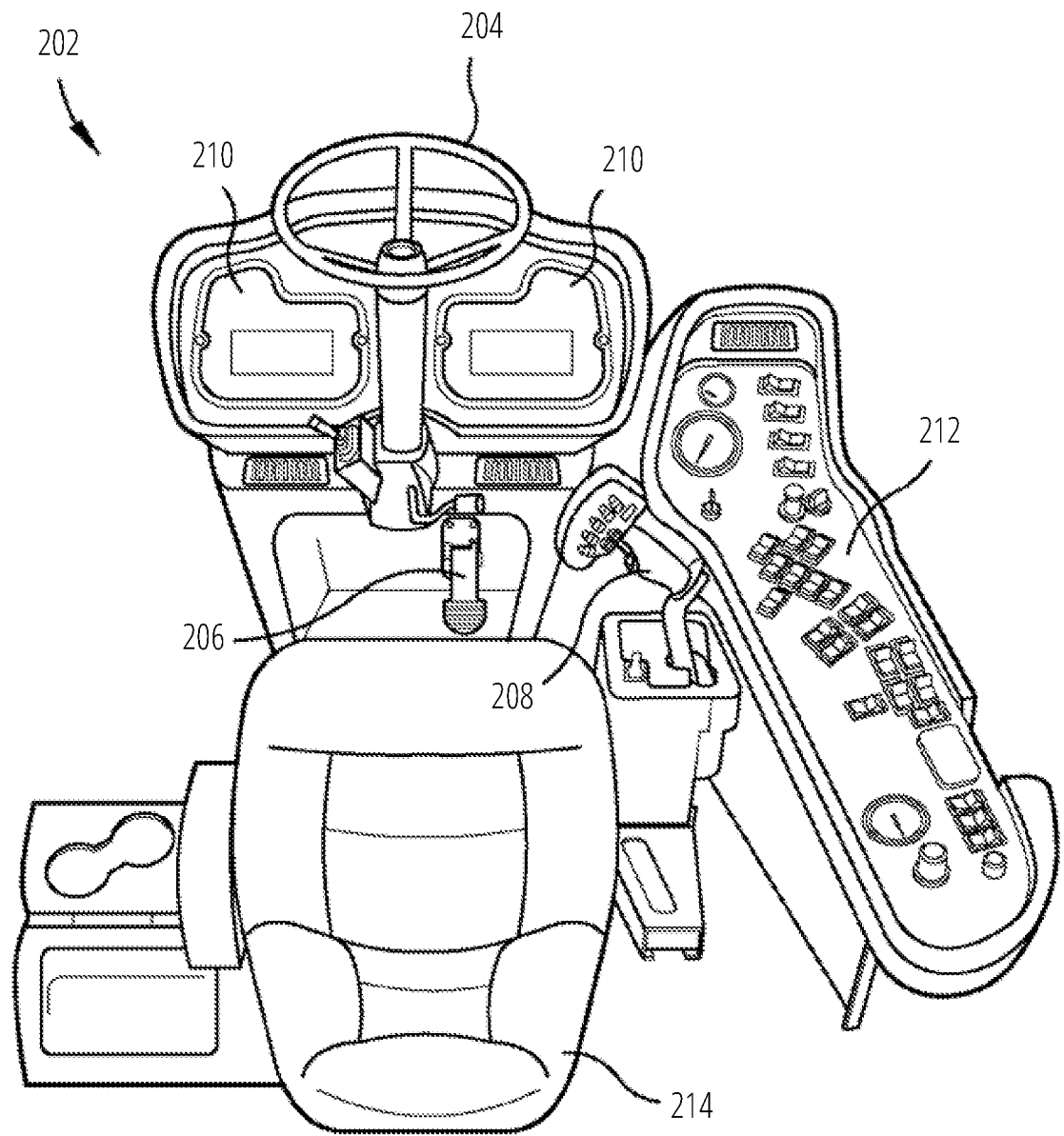
FIG. 2 illustrates certain features of a cabin of the applicator of FIG. 1 including one or more user interface elements allowing a user to control the applicator.
Figure 3:
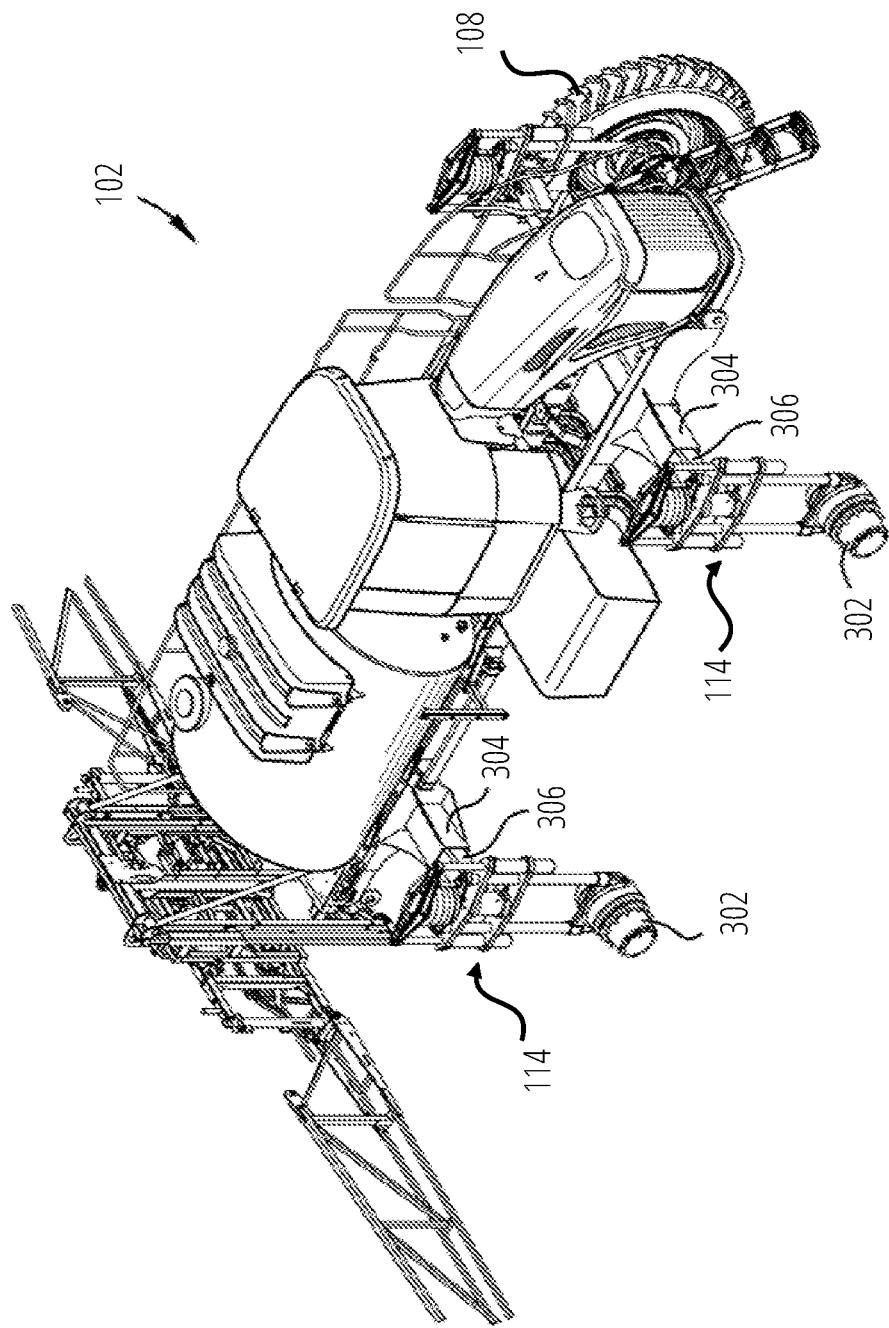
FIG. 3 is a perspective view of the agricultural applicator of FIG. 1 with two of the wheels omitted to more fully illustrate support assemblies interposed between the wheels and the chassis.

FIG. 3 illustrates the vehicle 102 with two of the wheels 108 removed to better illustrate the support assemblies 114 and their connection to the chassis 104. One or more drive motors 302 may be associated with the wheels 108 for driving rotation of the wheels 108 relative to the chassis 104 to propel the vehicle 102 in forward and reverse directions. In the illustrated embodiment, a separate hydraulic drive motor 302 is drivingly connected to each wheel 108 such that each of the wheels 108 may be driven independently to propel the vehicle 102. Either two or all four of the wheels 108 may be steerable. In some embodiments, the steering functionality of some of the wheels 108 may be selectively enabled and disabled. By way of example, the front wheels 108 may always be steerable, and supplemental steering provided by the rear wheels 108 may be selectively enabled and disabled. An operator may control the drive motors 302 and steering functions of the wheels 108, including enabling and disabling the steering ability of certain of the wheels 108, from one or more user interface elements of the control environment 202, illustrated in FIG. 2.

The vehicle 102 may include mechanisms for adjusting the track width of the wheels 108 to accommodate, for example, different spacing needs for row crops. In the illustrated embodiment, the vehicle 102 includes telescoping axles with an outer axle 304 and an inner axle 306 associated with each wheel 108, wherein the inner axle 306 slidingly engages the outer axle 304 and allows the associated wheel 108 to shift laterally relative to the chassis 104. A hydraulic piston or similar actuator may drive the inner axle 306 inward and outward to shift the position of the wheel 108. The inner axles 306 and outer axles 304 form part of the chassis 104 and, in the illustrated embodiment, the outer axles 304 are rigidly connected to another portion of the chassis 104, such as one or more frame elements. U.S. Patent Application Publication 2020/0130741, "Mounting Assembly for a Steerable Wheel with Variable Track Width," published Apr. 30, 2020, discloses an example of a telescopic axle with an actuator disposed inside the outer axle and arranged to drive the inner axle inward and outward to shift the lateral position of the associated support assembly and wheel.

As mentioned above, the vehicle 102 includes a support assembly 114 interposed between each of the wheels 108 and the chassis 104. Each support assembly 114 connects to a hub 118 of one of the wheels 108 and to one of the inner axles 306 such that the wheel 108 and the support assembly 114 shift laterally as a single unit relative to the chassis 104 when the inner axle 306 is shifted relative to the outer axle 304 to adjust the track width of the vehicle 102. The support assemblies 114 may optionally include height-adjustment components for raising and lowering the chassis 104 between various operating positions. One or more of the support assemblies 114 (or portions thereof) may be selectively pivotable relative to the chassis 104 to steer the vehicle 102.

Figure 4:
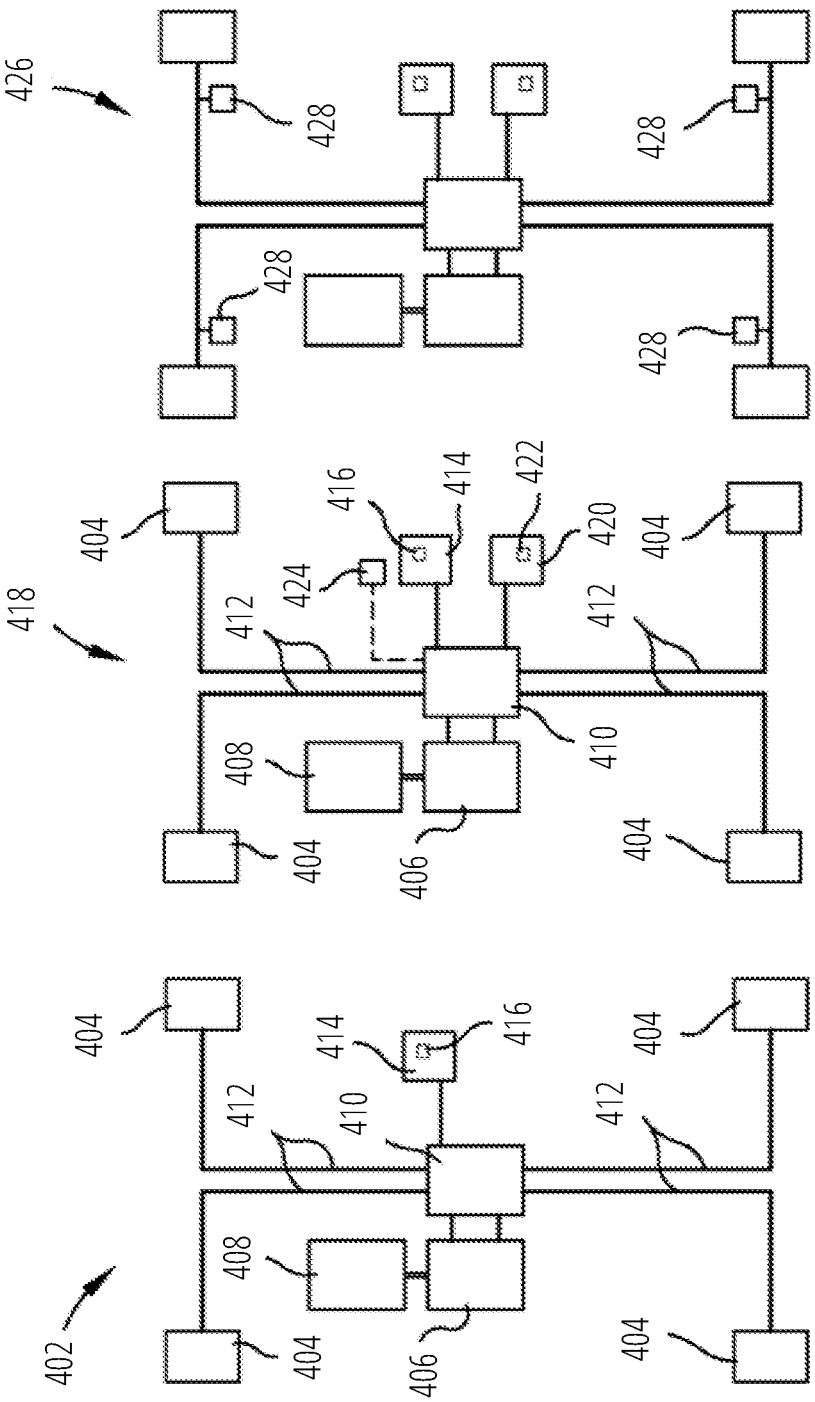
FIG. 4A, FIG. 4B, and FIG. 4C are block diagrams of various exemplary embodiments of control systems of the applicator of FIG. 1.
Figure 5:
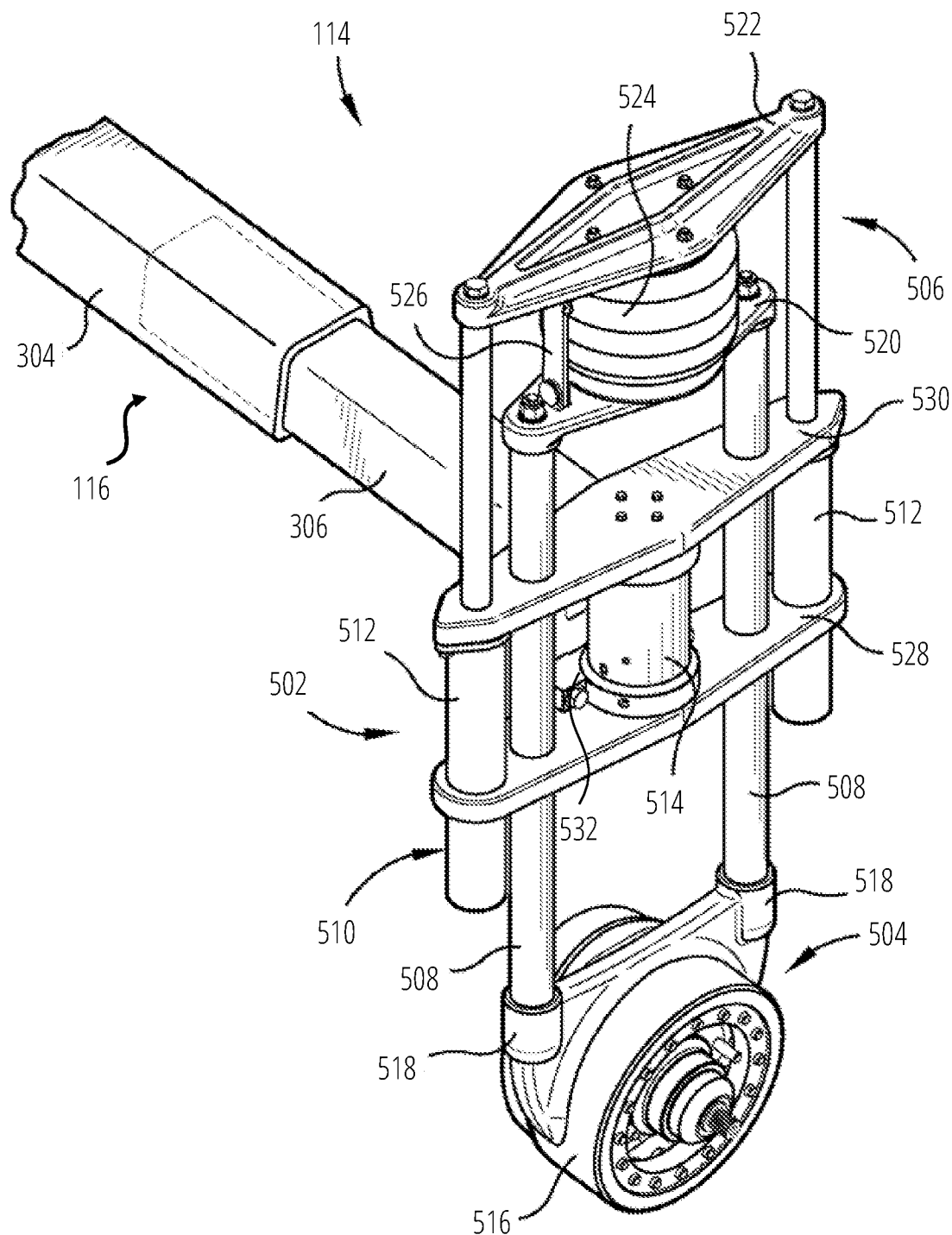
FIG. 5 is an outside perspective view of one of the support assemblies of the applicator of FIG. 3.
Figure 6:
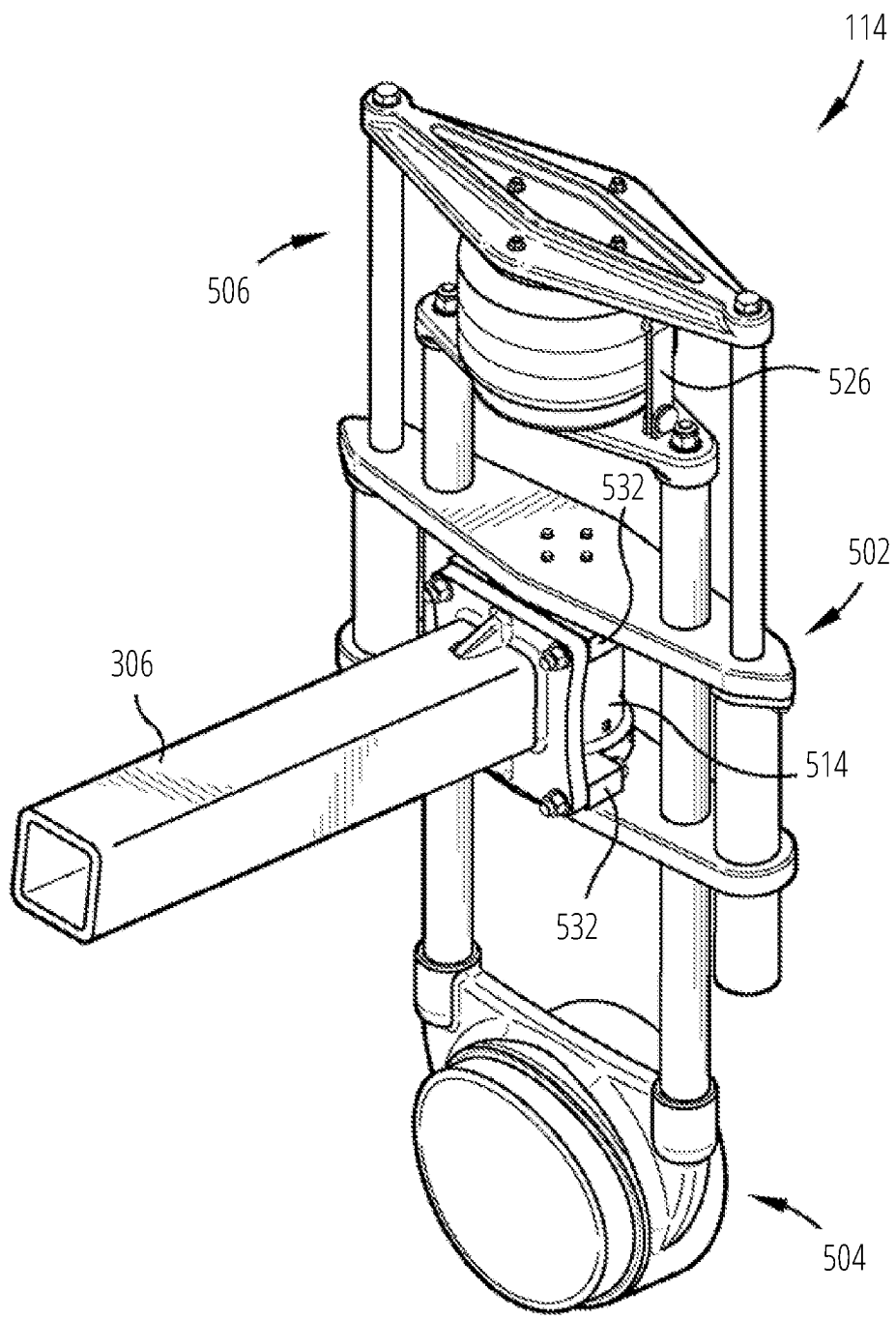
FIG. 6 is an inside perspective view of the support assembly of FIG. 5.
Figure 7:
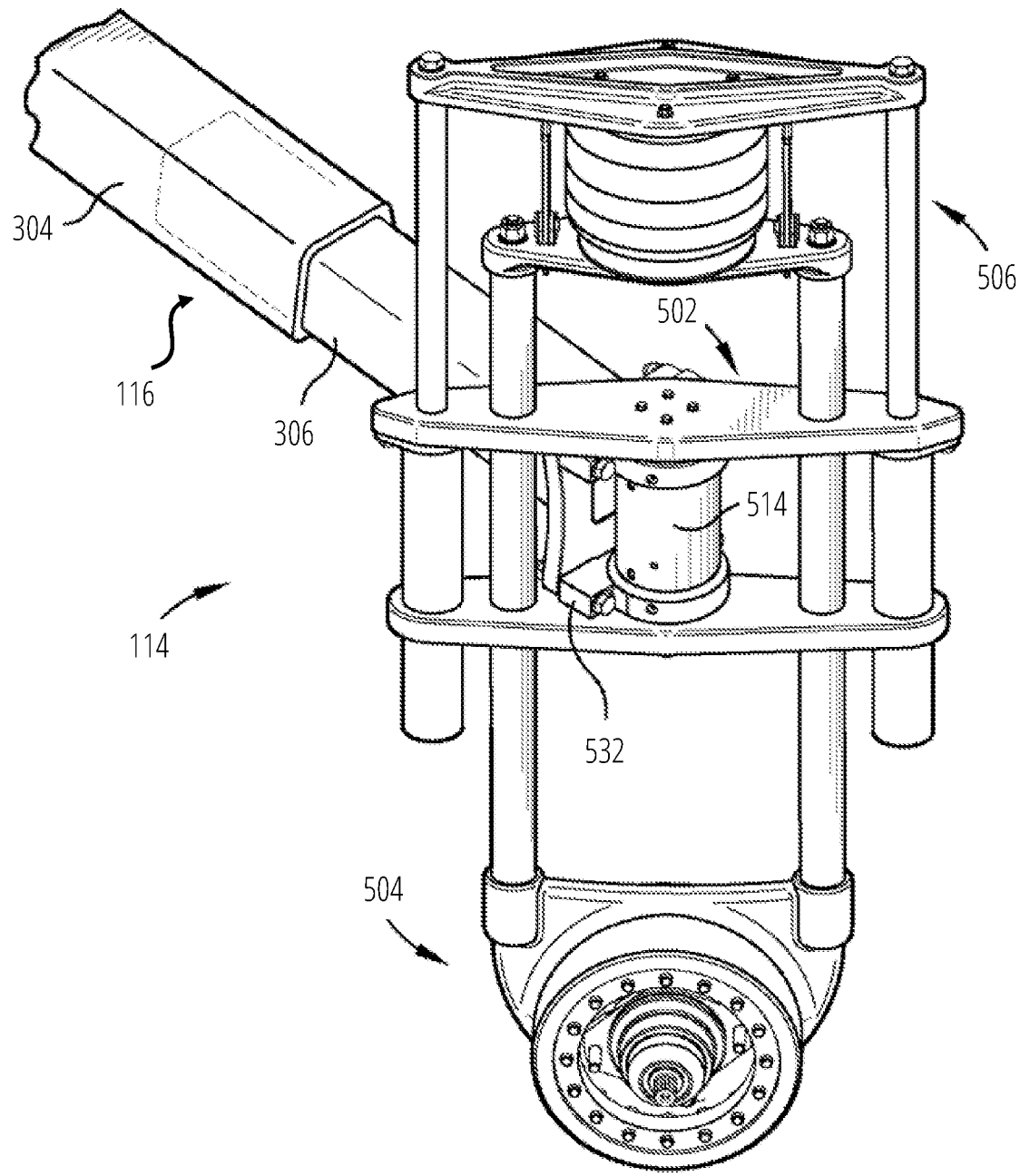
FIG. 7 illustrates the support assembly of FIG. 5 pivoted to a first position relative to an axle of the applicator.
Figure 8:
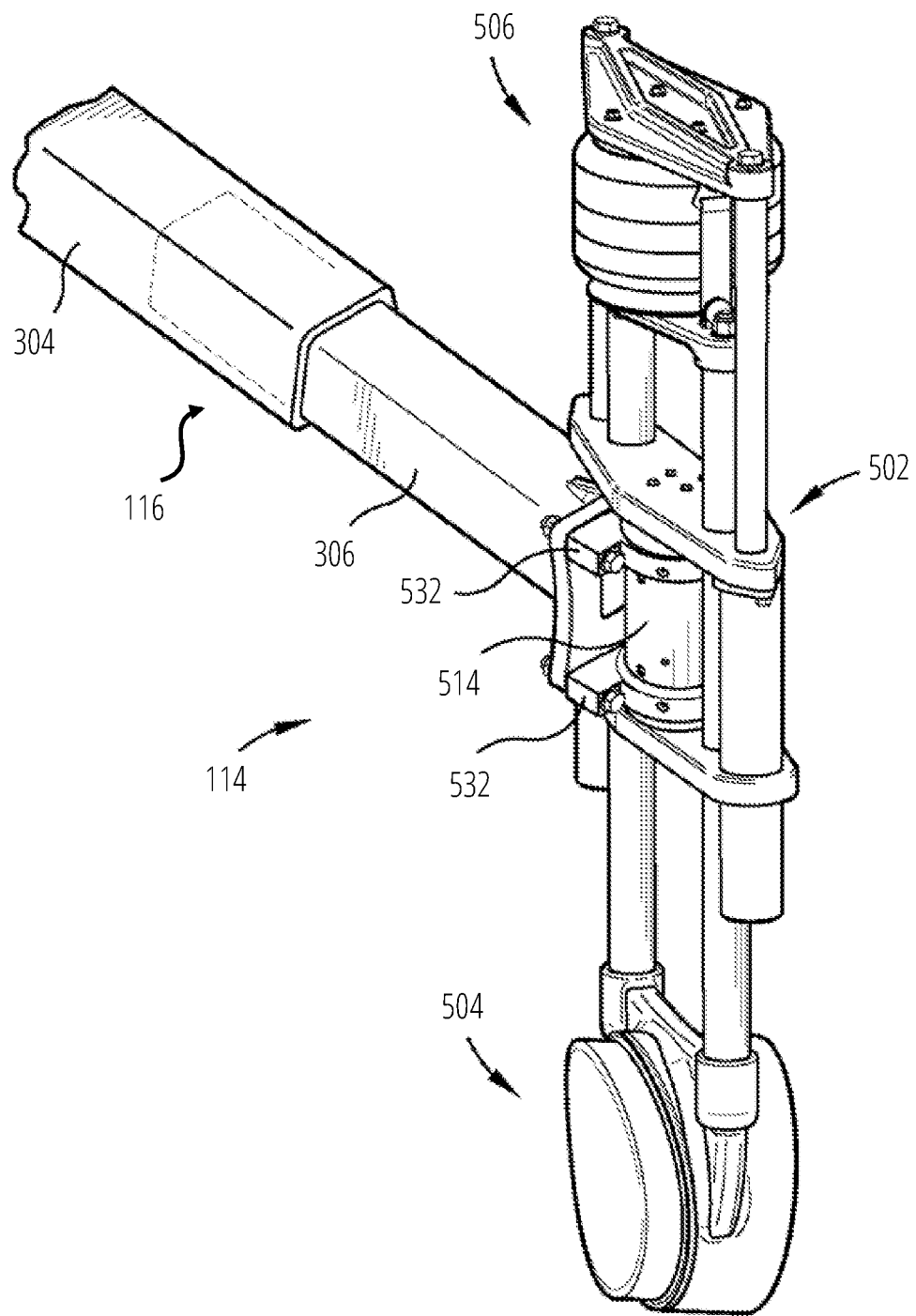
FIG. 8 illustrates the support assembly of FIG. 5 pivoted to a second position relative to the axle.
Figure 9:
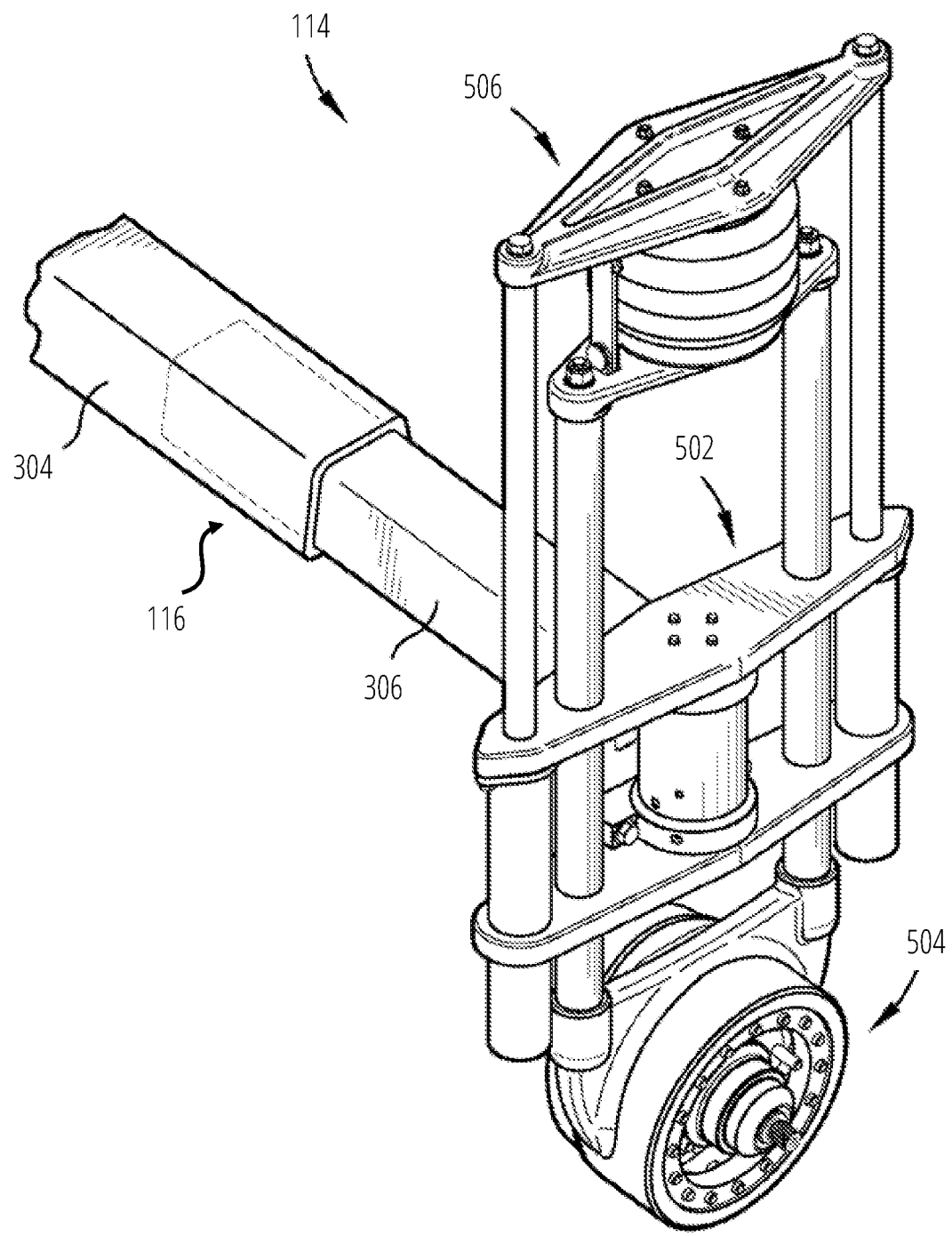
FIG. 9 illustrates the support assembly of FIG. 5 in a first operating position.

Each of the support assemblies 114 may include one or more actuators for adjusting a height of the chassis 104, for steering the associated wheel 108, or both. In some embodiments, the actuators are hydraulic actuators such as linear or rotary hydraulic actuators. FIG. 4A illustrates an exemplary hydraulic control system 402 for operating hydraulic actuators 404, in which a common fluid source, such as centralized hydraulic pump 406 driven by an internal combustion engine 408 or another power source, communicates pressurized hydraulic fluid to a hydraulic controller 410 that regulates fluid flow between the hydraulic pump 406 and the hydraulic actuators 404 associated with the support assemblies 114 (FIG. 1) via a plurality of hydraulic transfer lines 412. The hydraulic controller 410 may include, for example, a hydraulic manifold or similar device.

Each of the hydraulic transfer lines 412 communicates hydraulic power between the hydraulic controller 410 and one or more hydraulic actuators 404 and, thus, may include one or more hydraulic pressure lines and one or more hydraulic return lines. Each of the hydraulic transfer lines 412 may communicate hydraulic power to more than one actuator 404, and each of the actuators 404 may include a group of actuators associated with each wheel 108 and/or support assembly 114. By way of example, a first actuator 404 may drive steering of a wheel 108, a second actuator 404 may drive rotation of the wheel 108, and a third actuator 404 may adjust a height of the chassis 104. It will be appreciated that the actuators 404 are exemplary in nature and that the various actuators 404 may not be grouped as described herein.

The hydraulic control system 402 includes a control interface 414 in communication with the hydraulic controller 410. The control interface 414 may be part of a user interface that includes one or more physical or virtual user interface elements 416, such as buttons, switches, or dials, and may be part of the control environment 202 (FIG. 2).

Various different types of technology may be used to actuate the support assemblies 114. Though the actuators 404 are illustrated and described herein as hydraulic actuators, it will be understood that other types of actuators may be used in place of, or in connection with, the hydraulic actuators 404. By way of example, electro-mechanical actuators may be used in place of at least some of the hydraulic actuators 404 illustrated and discussed herein.

FIG. 4B illustrates another exemplary control system 418 similar to the hydraulic control system 402, but that includes a computerized controller 420 with a control module 422 for controlling the hydraulic controller 410. The control system 418 may also include a wireless interface element 424 in wireless communication with the hydraulic controller 410 to enable a user to remotely control the actuators 404. The wireless interface element 424 may be a dedicated device, such as a device similar to a key-fob commonly used with cars and other vehicles, or a computing device such as smart phone, tablet computer, or wearable computing device programmed or configured for use with the control system 418. The wireless interface element 424 may be configured to communicate with the hydraulic controller 410 and/or the computerized controller 420 via short-range wireless communications, such as Wi-Fi or Bluetooth, or via a communications network such as a cellular network.

The controller 420 may include one or more integrated circuits programmed or configured to control the hydraulic controller 410 to actuate the support assemblies 114. By way of example, the controller 420 may include one or more general purpose microprocessors or microcontrollers, programmable logic devices, or application specific integrated circuits. The controller 420 may also include one or more discrete and/or analog circuit components operating in conjunction with the one or more integrated circuits, and may include or have access to one or more memory or storage elements operable to store executable instructions, data, or both. The control module 422 may be a hardware or software module specifically dedicated to enabling the controller 420 to control the hydraulic controller 410 as described herein.

Another control system 426, illustrated in FIG. 4C, is similar to the control system 418, but includes additional hydraulic circuit components, such as hydraulic accumulators 428. In some embodiments, each of the support assemblies 114 may include a single hydraulic actuator 404 that both raises and lowers the chassis 104 and provides suspension functions, as explained below. Such hydraulic systems may require specialized hydraulic circuit components such as the hydraulic accumulators 428.

One of the support assemblies 114 is illustrated in greater detail in FIG. 5 through FIG. 10. It should be understood that the support assembly 114 is one example, and many alternative constructions may be used instead. For example, U.S. Pat. No. 9,180,747, "System and Method of Adjusting the Chassis Height of a Machine," granted Nov. 10, 2015, discloses a number of different support assembly configurations that may be used.

The support assembly 114 depicted in FIG. 5 through FIG. 10 broadly includes a chassis attachment component 502 for attaching to the chassis 104 of the vehicle 102; a wheel attachment component 504 for attaching to a wheel 108 or other ground-engaging element; a suspension component 506 operably interposed between the chassis attachment component 502 and the wheel attachment component 504 for regulating motion transfer between the chassis attachment component 502 and the wheel attachment component 504; a plurality of strut bars 508 connecting the wheel attachment component 504 to the suspension component 506; and a height-adjustment mechanism 510 comprising a plurality of height-adjustment actuators 512 for shifting the wheel attachment component 504 between a plurality of operating positions relative to the chassis attachment components 502. The chassis attachment component 502 may include a pivot element 514 for allowing the support assembly 114 to pivot relative to the chassis 104, and a pivot actuator may drive the pivoting motion to steer a wheel 108 or other ground engaging element connected to the wheel attachment component 504. In the illustrated embodiment, the pivot element 514 is or includes a rotary actuator.

The wheel attachment component 504 has a generally cylindrical body 516 and a pair of upwardly-opening receptacles 518 for receiving and connecting to the strut bars 508. The receptacles 518 are positioned on opposite sides of and above the generally cylindrical body 516. Pivot torque is transferred to the wheel attachment component 504 by the strut bars 508 via the receptacles 518. The wheel attachment component 504 includes a plurality of apertures or other features spaced angularly around the generally cylindrical body 516 for connecting to a hub of a wheel, a hydraulic motor and/or a gear reduction hub, a caliper disc brake assembly, a parking brake assembly, and/or similar components.

The suspension component 506 includes a lower suspension member 520, an upper suspension member 522, and a pneumatic spring 524 or similar motion-regulating element positioned between and attached to the upper suspension member 522 and the lower suspension member 520. The upper suspension member 522 is connected to a top side or portion of the spring 524 and the lower suspension member 520 is connected to a lower side or portion of the spring 524. Each upper suspension member 522 and lower suspension member 520 has an elongated shape and includes a plurality of apertures or other features for attaching to the spring 524. The lower suspension member 520 includes apertures or other features located proximate end portions thereof to facilitate connection to the strut bars 508, and the upper suspension member 522 includes apertures or other features located proximate outer portions thereof to facilitate connection to the height-adjustment mechanism 510. In the illustrated embodiment, the upper suspension member 522 is longer than the lower suspension member 520, enabling attachment to the height-adjustment actuators 512 positioned outboard of the lower suspension member 520.

The pneumatic spring 524 uses trapped or compressed air or other fluid to regulate motion transfer between the chassis attachment component 502 and the wheel attachment component 504. The pneumatic spring 524 may contain air, water, nitrogen, antifreeze, or other fluid and may be single, double, or triple convolute. A pair of flexible straps 526 may be positioned on opposite sides of the spring 524 to limit extension of the spring 524, and a bumper may be positioned inside or outside the spring to limit spring compression. Other mechanisms may be used in place of the pneumatic spring 524, including, for example, a coil-type compression spring, or a shock-absorbing cylinder and piston assembly.

The suspension components 506 of the support assemblies 114 may be the only components of the vehicle 102 configured to regulate vertical motion transfer between the wheels 108 (or other ground engaging element) and the chassis 104. The outer axles 304, for example, may be rigidly connected to portions of the frame of the vehicle 102. Furthermore, the suspension components 506 regulate motion transfer between the wheels 108 and the chassis 104 regardless of the operating position of the support assemblies 114. Thus, the suspension components 506 perform essentially the same function regardless of whether the chassis 104 is in a lowered position, a raised position, or somewhere in between.

The strut bars 508 are rigidly connected to the receptacles 518 of the wheel attachment component 504 and are rigidly coupled with the suspension component 506 such that movement of the wheel attachment component 504 relative to the chassis attachment component 502 is communicated through the suspension component 506 via the strut bars 508. More specifically, a first end of a first strut bar 508 is connected to a first receptacle 518 of the wheel attachment component 504, and a first end of a second strut bar 508 is connected to a second receptacle 518 of the wheel attachment component 504. A second end of the first strut bar 508 is connected to a first side of the lower suspension member 520, and a second end of the second strut bar 508 is connected to a second side of the lower suspension member 520. As explained above, the lower suspension member 520 is an elongate, rigid member with outer apertures on opposing ends thereof for connecting to the strut bars 508, and one or more inner apertures between the outer apertures for rigidly attaching to a first side or portion of the spring 524. Thus, the lower suspension member 520 interconnects the spring 524 and the strut bars 508.

The first and second strut bars 508 are parallel or substantially parallel to one another and are separated by a space. The strut bars 508 slidingly engage the chassis attachment component 502 to allow the wheel attachment component 504 to move relative to the chassis attachment component 502 while also transferring pivot torque between the wheel attachment component 504 and the chassis attachment component 502. The strut bars 508 may be separated by a space of between about 3 inches (7.6 cm) and 20 inches (51 cm) and, more specifically, may be separated by a space of between about 8 inches (20 cm) and about 15 inches (38 cm). The length of each of the strut bars 508 may be between about 12 inches (30 cm) and about 36 inches (91 cm) and, more specifically, between about 20 inches (51 cm) and about 30 inches (76 cm). The strut bars 508 may be positioned symmetrically about a center of the wheel attachment component 504 and a center of the chassis attachment component 502.

The chassis attachment component 502 has a lower chassis attachment member 528 and an upper chassis attachment member 530 separated by a space. The pivot element 514 is interposed between, and rigidly connected to, the lower chassis attachment member 528 and the upper chassis attachment member 530. Each of the attachment members 528, 530 includes a pair of spaced through-holes in axial alignment for slidingly receiving the strut bars 508. Each of the attachment members 528, 530 also includes a pair of apertures or other features positioned outboard of the through-holes for engaging the height-adjustment actuators 512.

The chassis attachment component 502 is rigidly but adjustably coupled with the upper suspension member 522 via the height-adjustment actuators 512 such that actuating the adjustment height-adjustment mechanism 510 causes the upper suspension member 522 to shift relative to the chassis attachment component 502, shifting the wheel attachment component 504 relative to the axle 116. The lower suspension member 520 is rigidly connected to the wheel attachment component 504 via the strut bars 508, as explained above, such that motion transfer between the chassis attachment component 502 and the wheel attachment component 504 passes through, and is regulated by, the suspension component 506. Such motion transfer may correspond to up-and-down movement of the wheels 108 relative to the chassis 104 such that the suspension component 506 may provide a spring or shock-absorbing function and may, for example, dampen motion transfer between the wheels 108 and the chassis 104.

The height-adjustment mechanism 510, comprising the height-adjustment actuators 512, is configured to shift the wheel attachment component 504 between a plurality of operating positions relative to the chassis attachment component 502. As used herein, an "operating position" is a selectable position of the wheel attachment component 504 relative to the chassis attachment component 502 in which the distance between the wheel attachment component 504 and the chassis attachment component 502 is rigidly or flexibly fixed. If the distance between the attachment components 502, 504 is flexibly fixed, the relative positions of the attachment components 502, 504 may fluctuate but will return to the same operating position. Stated differently, the average distance between the attachment components 502, 504 will remain approximately the same even though the instantaneous distance may fluctuate above and/or below the average distance. Fluctuations in the relative positions of the attachment components 502, 504 may result, for example, from operation of the suspension component 506, operation of a hydraulic component, or both.

Figure 10:
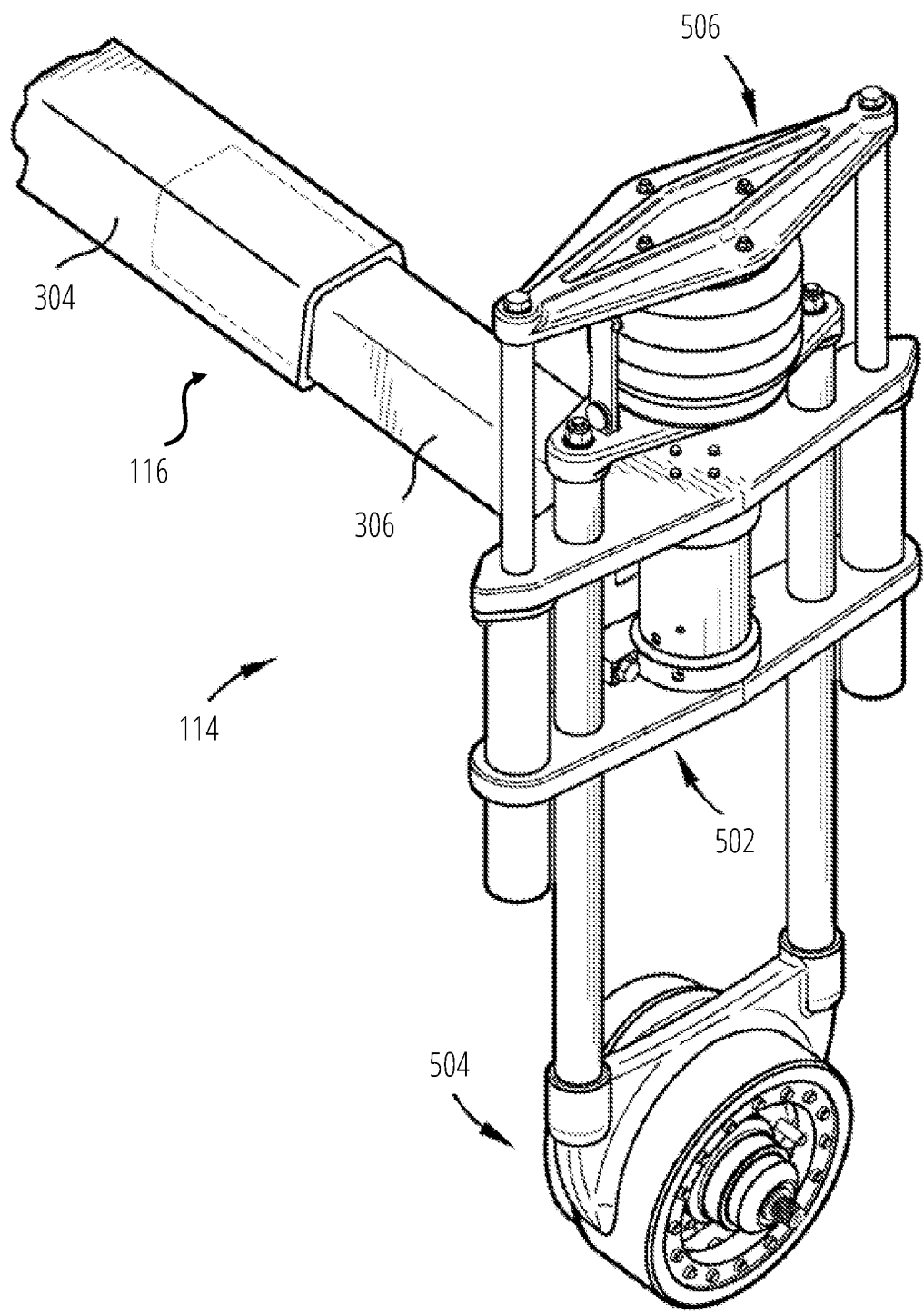
FIG. 10 illustrates the support assembly of FIG. 5 in a second operating position.

In operation, shifting the wheel attachment component 504 between operating positions relative to the chassis attachment component 502 will raise and lower the chassis 104 between various operating positions relative to the ground surface. Each support assembly 114 is operable to shift between two or more operating positions, such as between two, three, four, five, six, seven, eight, nine, ten, twelve, fourteen, or sixteen operating positions. Additionally, each support assembly 114 may be infinitely adjustable between a first extreme operating position (FIG. 9) and a second extreme operating position (FIG. 10). The difference between the first extreme operating position and the second extreme operating position may be within the range of about 5 inches (13 cm) to about 50 inches (130 cm). More specifically, the difference may be about 10 inches (25 cm), about 20 inches (51 cm), about 30 inches (76 cm), or about 40 inches (102 cm).

As illustrated, the height-adjustment actuators 512 are connected to the lower and upper chassis attachment members, 528, 530, and to the upper suspension member 522, such that extending or retracting the height-adjustment actuators 512 causes the upper suspension member 522 (and a top end or portion of the spring 524 to which it is connected) to shift up or down relative to the chassis attachment component 502. The height-adjustment actuators 512 may include fluid actuators and/or electro-mechanical actuators. By way of example, the height-adjustment actuators 512 may include hydraulic cylinders that drive piston rods between retracted and extended positions.

As used herein, the suspension component 506 is "operably interposed" between the wheel attachment component 504 and the chassis attachment component 502 if it regulates motion transfer between the two components 502, 504. Thus, the suspension component 506 need not be positioned physically between the attachment components 502, 504 in order to be operably interposed therebetween. As illustrated, the suspension component 506 may be positioned above (and in line with) both the wheel attachment component 504 and the chassis attachment component 502 and yet be operably interposed therebetween.

The support assembly 114 is configured to pivot relative to the axle 116 to pivot a wheel 108 coupled with the wheel attachment component 504 and steer the vehicle 102. The support assembly 114 may pivot between a first extreme position (FIG. 7) and a second extreme position (FIG. 8) about an axis of rotation passing through, and defined by, the pivot element 514. The extreme pivot positions may correspond to an angular separation of between, for example, about 90° and about 300°. The support assembly 114 pivots as a single unit such that the wheel attachment component 504, the chassis attachment component 502, and the suspension component 506 pivot in unison, regardless of the position of the wheel attachment component 504 relative to the chassis attachment component 502.

In the illustrated embodiment, the pivot element 514 attaches to an outer end of the axle 116, the suspension component 506 is positioned above the axle 116, and the wheel attachment component 504 is positioned below the axle 116 opposite the suspension component 506. Furthermore, the wheel attachment component 504, the chassis attachment component 502, and the suspension component 506 lie on a line that corresponds to, or is parallel with, the axis of rotation of the support assembly 114.

The pivot element 514 may include a rotary hydraulic actuator connected to the axle 116 and to the lower chassis attachment member 528 and the upper chassis attachment member 530. The rotary hydraulic actuator selectively drives pivoting movement of the support assembly 114 relative to the chassis 104, and may be controlled by a vehicle operator or an automated guidance system to steer the vehicle 102.

By way of example, the pivot element 514 may be a Helac L30 series helical hydraulic rotary actuator, available from Parker Hannifin, Cylinder Division, of Des Plaines, Illinois, or a similar device. A rotary hydraulic actuator is a device manufactured to drive or induce rotational movement in response to hydraulic input. Thus, a portion of the rotary actuator rotates relative to another portion of the rotary actuator and does not require external connections or components to generate rotational motion. A rotary actuator may be designed, for example, to internally translate linear motion into rotational motion. In one exemplary embodiment, the rotary hydraulic actuator may generate output torque of between 3,000 foot-pounds (4,070 N-m) and 32,000 foot-pounds (43,400 N-m) at a hydraulic pressure of between 2,000 psi (138 bar) and 4,000 psi (276 bar) or, more specifically, may generate torque of between 10,000 foot-pounds (13,600 N-m) and 25,000 foot-pounds (33,900 N-m) at a hydraulic pressure of between 2,000 psi (138 bar) and 4,000 psi (276 bar). The rotary actuator may have a total angular displacement of between about 90° and about 360°.

The illustrated pivot element 514 includes a plurality of spaced mounting feet or flanges 532 for securing to the axle 116 or other part of the chassis 104 and a cylindrical housing with opposing ends that mount to, and rotate, the lower chassis attachment member 528 and the upper chassis attachment member 530. In the illustrated embodiment, the flanges 532 are configured to attach to a plurality of attachment points arranged in a planar configuration, such as on a single planar surface. Thus, the pivot element 514 may function both to mount the chassis attachment component 502 to the axle 116 and to rotate the support assembly 114 relative to the axle 116 and, therefore, may simplify the design, manufacture, maintenance, and repair of the support assembly 114 and related components. The housing of the pivot element 514 may have a diameter of between about 5 inches (13 cm) and 12 inches (30 cm) and a length of between about 11 inches (28 cm) and about 40 inches (102 cm). The pivot element 514 and the connections between the pivot element 514 and the support assembly 114 and the axle 116 may be selected to be sufficiently strong to sustain the shock and rigors of routine use.

Rather than including a rotary actuator, the support assembly 114 may include, or may be coupled with, another type of actuator such as a linear hydraulic actuator for driving pivoting motion. Alternatively, the support assembly 114 may be configured to rigidly attach to the vehicle chassis 104 and not pivot relative to the chassis 104, wherein the chassis attachment component 502 is rigidly attached to the inner axle 306 or other portion of the chassis 104. This may be desirable, for example, when the support assembly 114 supports a ground engaging element that is not intended to steer the vehicle 102. The chassis attachment component 502 may be rigidly attached to the axle 116 by replacing the pivot element 514 with a casting of the same size and shape as the pivot element 514 to rigidly connect to the chassis attachment component 502 and to the axle 116. The support assembly 114 may be configured to facilitate interchanging a rotary actuator configured to pivot the assembly and a static component configured to secure the assembly in a fixed position. Bolts or other easily removable attachment elements may be used to secure the pivot element 514 to the axle 116 and to the support assembly 114 and may be positioned to facilitate access thereto. Thus, a pivot element 514 and a fixed element may both be provided with each of the support assemblies 114 such that a user may interchange the pivot element 514 and the fixed element as desired.

In operation, the support assemblies 114 may raise and lower the chassis 104 of the vehicle 102. More specifically, an operator may remotely control operation of the support assemblies 114 to raise and lower the chassis 104 using, for example, one of the user interface elements forming part of the control environment 202 illustrated in FIG. 2. Thus, the operator may raise and lower the chassis 104 while seated in the operator cabin 110.

In one exemplary scenario, the operator fills the liquid holding tank 120 at a central location, such as a local cooperative facility, and drives the vehicle 102 to a field in a lowered operating position. Once at the field, the operator controls the support assemblies 114 to raise the chassis 104 to a desired height to apply the product. The operator raises the chassis 104 while seated in the operator cabin 110. When the application is complete or before the vehicle 102 returns to the cooperative for additional product, the operator lowers the chassis 104 and drives the vehicle 102 to the cooperative or to another field. Adjusting the height of the chassis 104 allows for safer travel to and from the field by lowering the applicator's center of gravity and overall height.

In another exemplary scenario, the vehicle 102 and a tender vehicle are taken to an area of application, such as a field or group of fields. The vehicle 102 is placed in a lowered chassis position and prepared by filling it with liquid chemical or other product to be applied to a crop. The tender vehicle may be configured to interface with the vehicle 102 only when the vehicle 102 is in a lowered chassis position. When the vehicle 102 is prepared, the operator may drive the vehicle 102 to a starting position, raise the chassis 104 to a desired height using one or more user interface elements within the operator cabin 110, and begin the application process. The operator refills the vehicle 102 by returning to the tender vehicle, lowering the applicator chassis 104 to interface with the tender vehicle, then raising the chassis 104 after the vehicle 102 has been refilled, to resume the application operation. When application for a first crop is complete, the vehicle 102 may be used to apply a chemical to a second crop of a different height than the first crop. The operator may adjust the chassis height of the vehicle 102 for application on the second crop, wherein a selected height for application on the second crop may be different than a selected height for application on the first crop.

In another exemplary scenario, the vehicle 102 may be used to apply a liquid to an agricultural field using the application system 106 shown in FIG. 1 that includes a liquid holding tank 120, a delivery system 122, and a laterally extending applicator boom 124 carrying nozzles. Afterward, the application system 106 may be removed from the chassis 104, and another application system may be installed, which may be adapted for applying particulate solid material.

Figure 11:
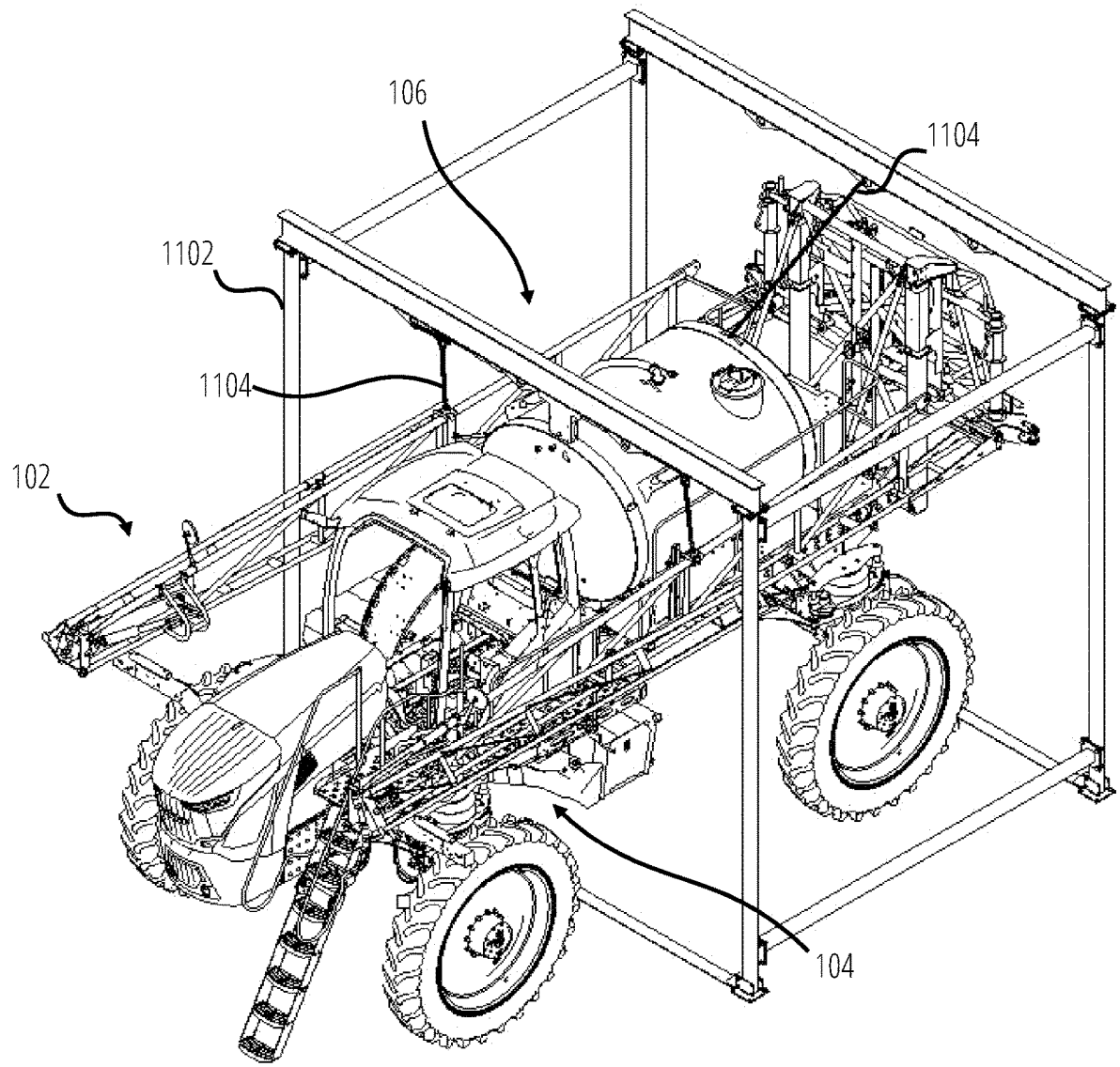
FIG. 11 is a simplified perspective view of the applicator shown in FIG. 1, with the application system supported by a fixed support.

For example, and as shown in FIG. 11, the vehicle 102 may be driven into or under a fixed support 1102, depicted as a structural frame. The fixed support 1102 may be within or a part of a building, such as a shop, garage, or barn. In other embodiments, the fixed support 1102 may be outdoors. In some embodiments, the fixed support 1102 may be a free-standing frame. The fixed support 1102 need not have a crane or other lift mechanism. While the application system 106 of the vehicle 102 is within or under the fixed support 1102, the operator may place the chassis 104 in a raised position. The raised position need not be the highest position, so long as the chassis 104 is high enough that the application system 106 can be supported by hanging supports 1104 or other support elements connected to the fixed support 1102. The hanging support 1104 may be, for example, chains, straps, bars, or other supports. The hanging support 1104 is connected to the application system 106, and the application system 106 is disconnected from the chassis 104. The chassis 104 is then lowered, leaving the application system 106 supported above it by the hanging support 1104. The vehicle 102 can then be driven out from under the fixed support 1102.

Figure 12:
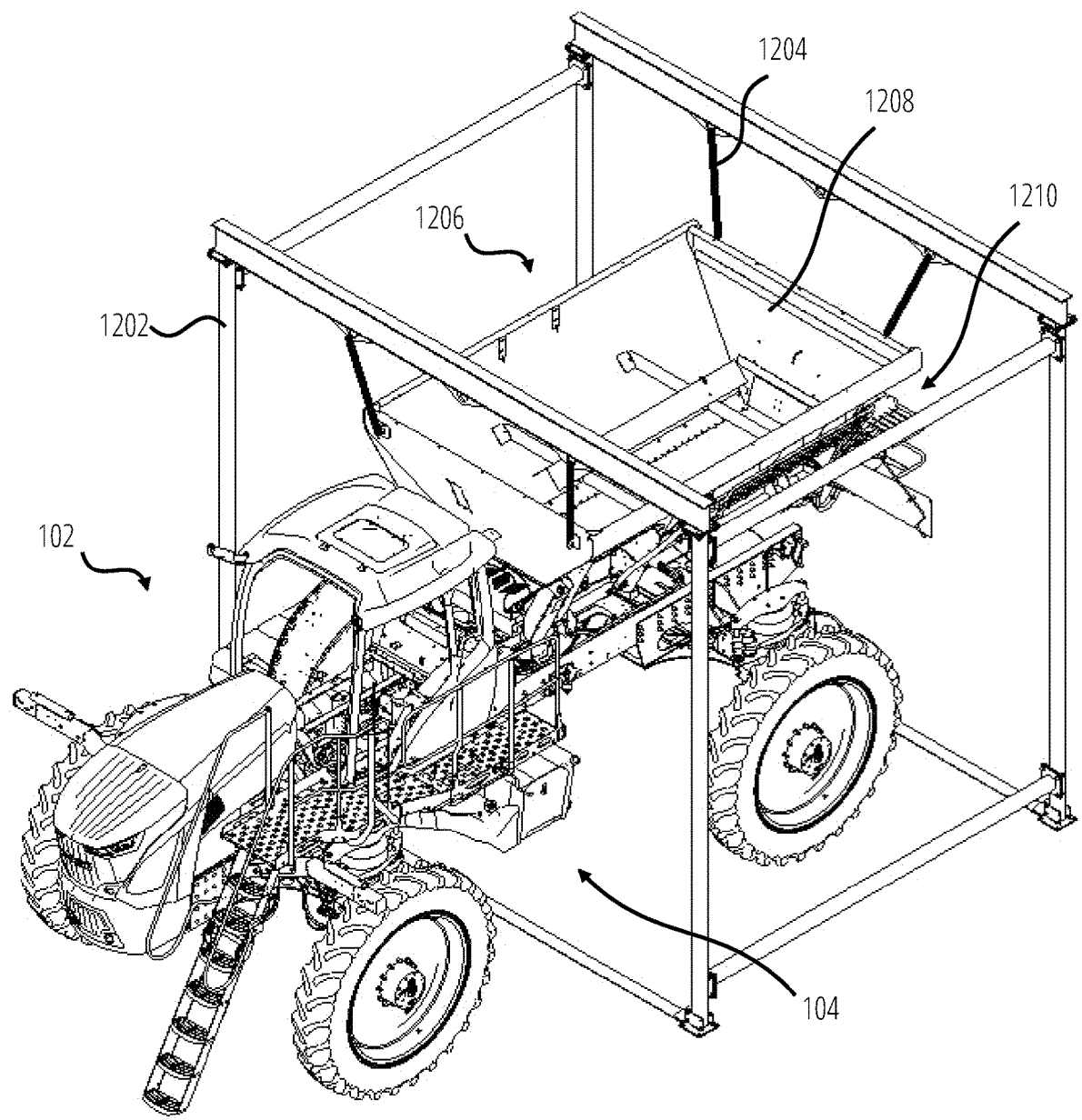
FIG. 12 is a simplified perspective view of the applicator shown in FIG. 1, with another application system supported by a fixed support.

As shown in FIG. 12, the vehicle 102 with its chassis 104 may be driven into or under another fixed support 1202, similar to the fixed support 1102 shown in FIG. 11, and also depicted as a structural frame. The fixed support 1202 may have hanging supports 1204 supporting another application system 1206, depicted as including a solid product hopper 1208 and a solid material spreader 1210. The operator may translate the chassis 104 forward or backward by rotating the wheels 108, in known manner, to bring the chassis 104 generally under the application system 1206. To align the chassis 104 with the application system 1206 such that the application system 1206 can be secured to the chassis 104, the operator may laterally translate the chassis 104 along the axles 116. For instance, the inner axles 306 on one side of the vehicle 102 may extend from the outer axles 304, while the inner axles 306 on the opposite side of the vehicle 102 retract into the outer axles 304 at approximately the same rate. Thus, the chassis 104 may move laterally along the axle 116 without moving the wheels 108 or changing the track width. This enables the operator to laterally align the chassis 104 to a preselected position (i.e., under the application system 1206) and facilitate connection of the application system 1206 to the chassis 104. Such alignment may be performed while the operator is in the operator cabin 110, or while the operator is outside the vehicle 102. If performed outside the vehicle 102, the operator may visually observe the alignment of the chassis 104 with the application system 1206. Furthermore, because the chassis 104 can move laterally along the axles 116, the operator need not perfectly center the chassis 104 under the application system 1206 by steering the wheels 108 while moving the vehicle 102 forward or backward. The operator may instead simply "nudge" the chassis 104 left or right as needed to center the chassis 104 under the application system 1206. If the application system 1206 has frame rails or other structural elements to align with corresponding supports on the chassis 104, the operator can use those frame rails as a visual reference to indicate when the chassis 104 is properly aligned.

Once the chassis 104 is aligned laterally and in a forward/reverse direction, the height-adjustment mechanisms 510 may be extended to lift the chassis 104 upward to a position in which the chassis 104 can support the application system 1206. The application system 1206 can then be connected to the chassis 104, and the hanging supports 1204 are disconnected from the application system 1206. The vehicle 102 can then be driven out from under the fixed support 1202 and operated as normal (e.g., by filling the solid product hopper 1208 and distributing material from the solid material spreader 1210).

When the time comes to switch the vehicle 102 back to using the application system 106 for liquids, the process is reversed by driving the vehicle 102 under the fixed support 1202, supporting the application system 1206 therewith, then driving the vehicle 102 under the application system 106 supported by the fixed support 1102. The chassis 104 may be moved laterally while the support assemblies 114 remain stationary. The position of the chassis 104 may be fine-tuned laterally to align the chassis 104 with the application system 106, such that lateral movement of the application system 106 along the fixed support 1102 may not be required. Once in place, the chassis 104 is raised by extending the height-adjustment mechanisms 510 until the chassis 104 supports the application system 106.

In some embodiments, the vehicle 102 may have a fixed-height chassis 104 (i.e., the support assemblies 114 may lack height-adjustment capability). In such embodiments, a lifting mechanism external to the vehicle 102 may be used to lift the application systems 106, 1206, such as a hoist, a forklift, etc. The chassis 104 may still be aligned laterally by extending the axles 116 on one side of the chassis 104 and retracting the axles 116 on the opposite side of the chassis 104. Such fine adjustment of the lateral position of the chassis 104 may improve operator safety and limit the need to reposition the lifting mechanism.

In some embodiments, the controller 420 may be used to automatically move the chassis 104 into a preselected position after receiving a command from a user via a user interface. For example, the controller 420 may move the chassis 104 to align certain visible or otherwise detectable elements of the application systems 106, 1206 and the chassis 104.

Thus, the systems and methods described and shown may enable the use of multiple application systems 106, 1206 on a single chassis 104. Such a system may have lower total cost than the cost of separate vehicles for liquid and solid application systems. Furthermore, the disclosed systems and methods may be used to change the application systems 106, 1206 without the use of a crane, hoist, forklift, or other lifting device to maneuver and align the application system 106, 1206. Such lifting devices may be cumbersome, time-consuming, and require another operator. The fixed supports 1102, 1202 may be relatively inexpensive if they do not include lifting and alignment mechanisms.

Figure 13:
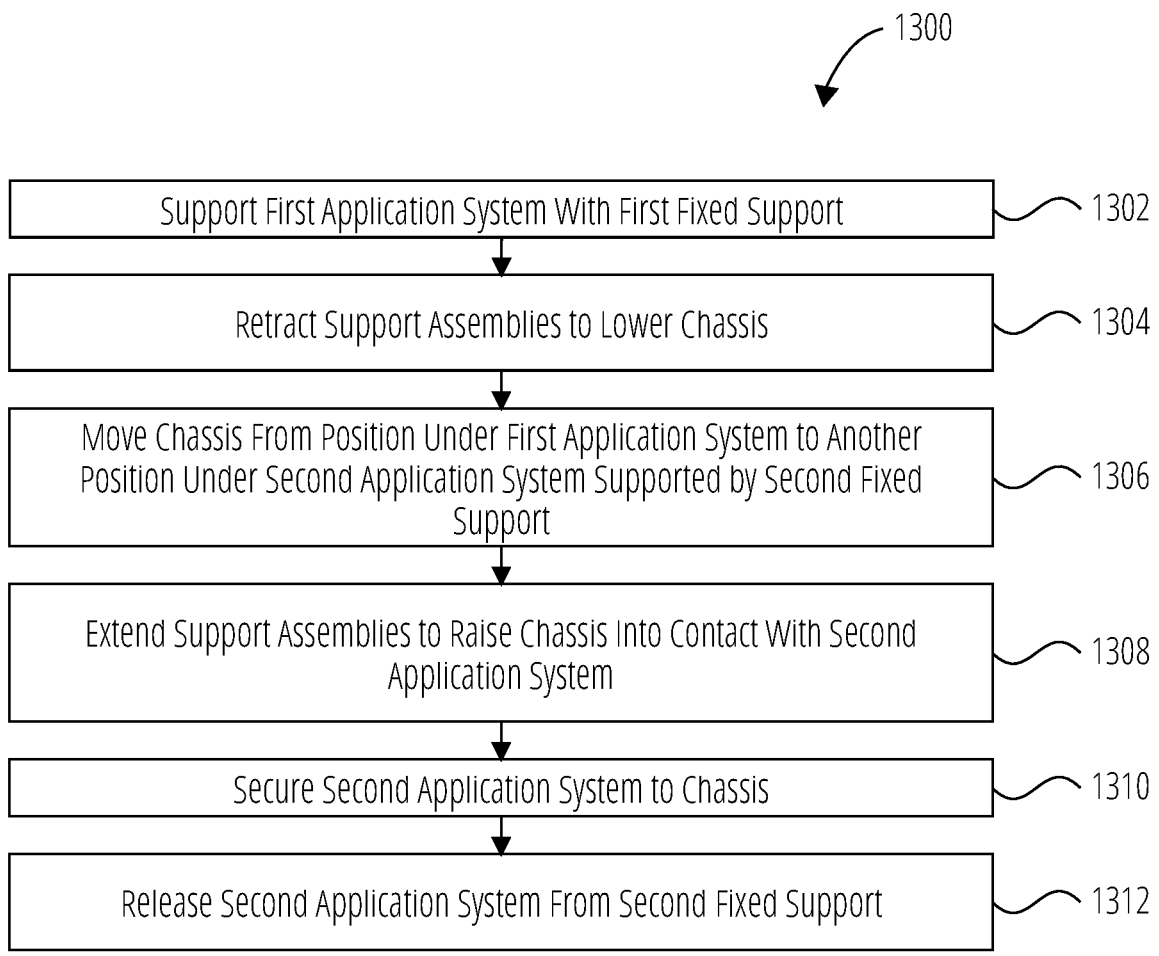
FIG. 13 is a simplified flow chart illustrating a method of servicing an agricultural vehicle, such as the applicator shown in FIG. 1.

FIG. 13 is a simplified flow chart illustrating a method 1300 of servicing a vehicle, such as the vehicle 102 shown in FIG. 1. The vehicle has a chassis, ground-engaging elements configured to support the chassis above a ground surface, and height-adjustable support assemblies supporting the chassis on the ground-engaging elements. The service includes changing from one application system (e.g., a liquid application system 106) to another (e.g., a solid application system 1206).

In block 1302, a first application system is supported with a first fixed support. Block 1304 represents retracting the support assemblies to lower the chassis (e.g., by retracting height-adjustment actuators).

In block 1306, the chassis is moved from a position under the first application system to another position under a second application system supported by a second fixed support. In some embodiments, the chassis is moved laterally relative to the support assemblies without changing a track width of the ground-engaging elements to align the chassis with the second application system. In one embodiment, a command to move the chassis to align with the second application system is received by a controller operable to control the support assemblies and axles of the vehicle. For example, the command may be transmitted by an operator in an operator cabin, on a control panel external to the vehicle (e.g., on an exterior of the chassis), or on a remote device (e.g., a mobile phone via wireless link). In some embodiments, the control panel may be a part of a service tool that is connected (e.g., via wired or wireless communication) to the vehicle only when lateral chassis movement is needed.

In block 1308, the support assemblies are extended to raise the chassis into contact with second application systems (e.g., by extending height-adjustment actuators). Block 1310 represents securing the second application system to the chassis. In block 1312, the second application system is released from the second fixed support. The machine is then ready to operate using the second application system.

Though depicted as a flow chart, the actions in FIG. 13 may be performed concurrently, and in some embodiments, some actions may be omitted.

Figure 14:
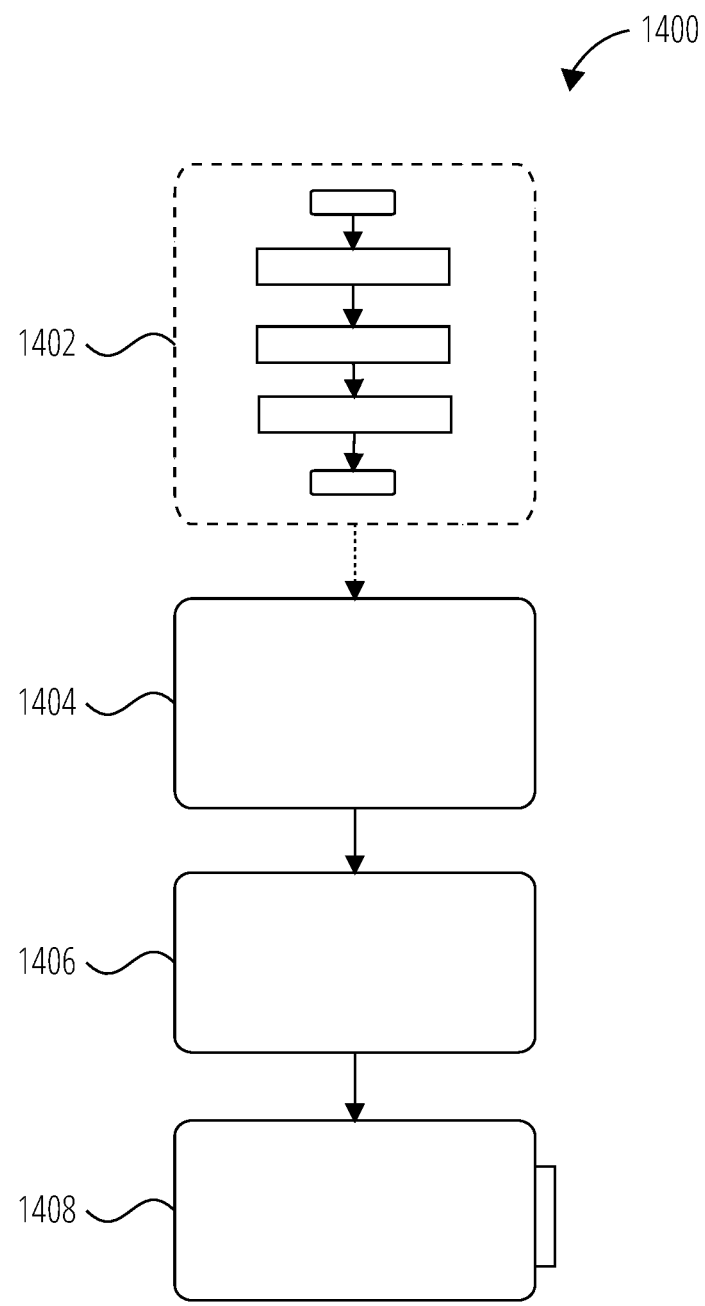
FIG. 14 illustrates an example computer-readable storage medium comprising processor-executable instructions configured to embody one or more of the methods of operating vehicle, such as the method illustrated in FIG. 13.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 14, wherein an implementation 1400 includes a computer-readable storage medium 1402 (e.g., a flash drive, CD-R, DVD-R, application-specific integrated circuit (ASIC), field-programmable gate array (FPGA), a platter of a hard disk drive, etc.), on which is computer-readable data 1404. This computer-readable data 1404 in turn includes a set of processor-executable instructions 1406 configured to operate according to one or more of the principles set forth herein. In some embodiments, the processor-executable instructions 1406 may be configured to cause a computer associated with the vehicle 102 (FIG. 1) to perform operations 1408 when executed via a processing unit, such as at least some of the example method 1300 depicted in FIG. 13. In other embodiments, the processor-executable instructions 1406 may be configured to implement a system, such as at least some of the example vehicle 102 depicted in FIG. 1. That is, the control environment 202 may include or be connected to the implementation 1400 of FIG. 14. Many such computer-readable storage media may be devised by those of ordinary skill in the art that are configured to operate in accordance with one or more of the techniques described herein.

Additional non-limiting example embodiments of the disclosure are described below.

Embodiment 1: A method of servicing a vehicle comprising a chassis, a plurality of ground-engaging elements configured to support the chassis above a ground surface, and a plurality of support assemblies supporting the chassis on the ground-engaging elements. The method comprises laterally translating the chassis relative to the support assemblies without changing a track width of the ground-engaging elements.

Embodiment 2: The method of Embodiment 1, further comprising adjusting height-adjustment actuators associated with the support assemblies to raise or lower the chassis.

Embodiment 3: The method of Embodiment 2, wherein adjusting the height-adjustment actuators comprises extending each of the height-adjustment actuators to raise the chassis relative to the ground surface, and lifting an application system with the chassis.

Embodiment 4: The method of Embodiment 1, further comprising lifting an application system from the chassis.

Embodiment 5: The method of any one of Embodiment 1 through Embodiment 4, wherein translating the chassis laterally relative to the support assemblies comprises aligning the chassis with an application system to be installed on the vehicle.

Embodiment 6: The method of Embodiment 5, wherein aligning the chassis with the application system to be installed on the vehicle comprises aligning frame rails of the application system with corresponding supports on the chassis.

Embodiment 7: The method of any one of Embodiment 1 through Embodiment 6, wherein laterally translating the chassis relative to the support assemblies comprises extending axles on a first side of the chassis while retracting axles on a second, opposite side of the chassis.

Embodiment 8: The method of any one of Embodiment 1 through Embodiment 7, wherein laterally translating the chassis relative to the support assemblies comprises transmitting a command from a control panel to a controller.

Embodiment 9: The method of Embodiment 8, wherein the control panel is located at location selected from the group consisting of inside an operator cab, on an exterior of the chassis, and in a mobile device.

Embodiment 10: A method of servicing a vehicle comprising a chassis, a plurality of ground-engaging elements configured to support the chassis above a ground surface, and a plurality of height-adjustable support assemblies supporting the chassis on the ground-engaging elements. The method comprises supporting a first application system with a first fixed support, retracting the support assemblies to lower the chassis, moving the chassis from a first position under the first application system to a second position under a second application system supported by a second fixed support, extending the support assemblies to raise the chassis into contact with the second application system, securing the second application system to the chassis, and releasing the second application system from the second fixed support.

Embodiment 11: The method of Embodiment 10, wherein moving the chassis from the first position to the second position comprises driving the ground-engaging elements to move the chassis from the first position to the second position, and moving the chassis laterally relative to the support assemblies without changing a track width of the ground-engaging elements to align the chassis with the second application system.

Embodiment 12: The method of Embodiment 10 or Embodiment 11, wherein moving the chassis from the first position to the second position comprises receiving a command to move the chassis to align with the second application system.

Embodiment 13: The method of any one of Embodiment 10 through Embodiment 12, wherein each of the first application system and the second application system is configured to apply a liquid or a solid to an agricultural field.

Embodiment 14: The method of any one of Embodiment 10 through Embodiment 13, wherein moving the chassis from the first position to the second position comprises receiving a command to move the chassis to a preselected position under the second application system.

Embodiment 15: The method of any one of Embodiment 10 through Embodiment 14, wherein extending the support assemblies to raise the chassis into contact with the second application system comprises adjusting the support assemblies to move the chassis to a preselected position.

Embodiment 16: The method of any one of Embodiment 10 through Embodiment 15, further comprising raising the chassis before supporting the first application system with the first fixed support.

Embodiment 17: A vehicle comprising a chassis, a plurality of ground-engaging elements configured to support the chassis above a ground surface, a plurality of support assemblies supporting the chassis on the ground-engaging elements, a plurality of adjustable axles configured to change a lateral distance from the chassis to each of the support assemblies, and a controller configured to move the chassis laterally along the axles without changing a track width between ground-engaging elements on opposing sides of the chassis.

Embodiment 18: The vehicle of Embodiment 17, further comprising an application system carried by the chassis. The application system comprises a liquid holding tank and a plurality of nozzles spaced along a laterally extending applicator boom. The nozzles are configured to deliver liquid from the liquid holding tank to the ground surface.

Embodiment 19: The vehicle of Embodiment 17, further comprising an application system carried by the chassis. The application system comprises a solid product hopper, and at least one solid material spreader configured to deliver solid from the solid product hopper to the ground surface.

Embodiment 20: The vehicle of any one of Embodiment 17 through Embodiment 19, wherein the controller is configured to automatically move the chassis laterally along the axles after receiving a command from a user; and further comprising a user interface for allowing the user to send the command to the controller.

Embodiment 21: The vehicle of Embodiment 20, wherein the controller is configured to move the chassis laterally while the support assemblies remain stationary.

Embodiment 22: The vehicle of any one of Embodiment 17 through Embodiment 21, further comprising a control panel in communication with the controller, the control panel located at location selected from the group consisting of in an operator cab, on an exterior of the chassis, and in a mobile device.

Embodiment 23: The vehicle of any one of Embodiment 17 through Embodiment 22, wherein each support assembly comprises a height-adjustment actuator.

Embodiment 24: The vehicle of Embodiment 23, wherein the height-adjustment actuators each comprise hydraulic cylinders connected to a common fluid source via a respective control valve.

Embodiment 25: A non-transitory computer-readable storage medium. The computer-readable storage medium including instructions that when executed by a computer associated with a vehicle comprising a chassis, a plurality of ground-engaging elements configured to support the chassis above a ground surface, and a plurality of support assemblies supporting the chassis on the ground-engaging elements, cause the vehicle to laterally translate the chassis relative to the support assemblies without changing a track width of the ground-engaging elements.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various vehicle types and configurations.

What is claimed is:

1. A method of servicing a vehicle comprising a chassis, a plurality of ground-engaging elements configured to support the chassis above a ground surface, and a plurality of support assemblies supporting the chassis on the ground-engaging elements, the method comprising:
    laterally translating the chassis relative to the support assemblies without changing a track width of the ground-engaging elements;
    extending each of a plurality of height-adjustment actuators to raise the chassis relative to the ground surface; and
    lifting an application system with the chassis.

2. A method of servicing a vehicle comprising a chassis, a plurality of ground-engaging elements configured to support the chassis above a ground surface, and a plurality of support assemblies supporting the chassis on the ground-engaging elements, the method comprising:
    laterally translating the chassis relative to the support assemblies without changing a track width of the ground-engaging elements; and
    lifting an application system from the chassis.

3. A method of servicing a vehicle comprising a chassis, a plurality of ground-engaging elements configured to support the chassis above a ground surface, and a plurality of support assemblies supporting the chassis on the ground-engaging elements, the method comprising:
    translating the chassis laterally relative to the support assemblies without changing a track width of the ground-engaging elements to align the chassis with an application system to be installed on the vehicle.

4. The method of claim 3, wherein aligning the chassis with the application system to be installed on the vehicle comprises aligning frame rails of the application system with corresponding supports on the chassis.

5. A method of servicing a vehicle comprising a chassis, a plurality of ground-engaging elements configured to support the chassis above a ground surface, and a plurality of support assemblies supporting the chassis on the ground-engaging elements, the method comprising:
   laterally translating the chassis relative to the support assemblies without changing a track width of the ground-engaging elements to extend axles on a first side of the chassis while retracting axles on a second, opposite side of the chassis.

6. A method of servicing a vehicle comprising a chassis, a plurality of ground-engaging elements configured to support the chassis above a ground surface, and a plurality of support assemblies supporting the chassis on the ground-engaging elements, the method comprising:
   transmitting a command from a control panel to a controller; and
   laterally translating the chassis independent of a height of the chassis and relative to the support assemblies without changing a track width of the ground-engaging elements.

7. The method of claim 6, wherein the control panel is located at location selected from the group consisting of inside an operator cab, on an exterior of the chassis, and in a mobile device.

8. A method of servicing a vehicle comprising a chassis, a plurality of ground-engaging elements configured to support the chassis above a ground surface, and a plurality of height-adjustable support assemblies supporting the chassis on the ground-engaging elements, the method comprising:
   supporting a first application system with a first fixed support;
   retracting the support assemblies to lower the chassis;
   moving the chassis from a first position under the first application system to a second position under a second application system supported by a second fixed support;
   extending the support assemblies to raise the chassis into contact with the second application system;
   securing the second application system to the chassis; and
   releasing the second application system from the second fixed support.

9. The method of claim 8, wherein moving the chassis from the first position to the second position comprises:
   driving the ground-engaging elements to move the chassis from the first position to the second position; and
   moving the chassis laterally relative to the support assemblies without changing a track width of the ground-engaging elements to align the chassis with the second application system.

10. The method of claim 8, wherein moving the chassis from the first position to the second position comprises receiving a command to move the chassis to align with the second application system.

11. The method of claim 8, wherein each of the first application system and the second application system is configured to apply a liquid or a solid to an agricultural field.

12. The method of claim 8, wherein moving the chassis from the first position to the second position comprises receiving a command to move the chassis to a preselected position under the second application system.

13. The method of claim 8, wherein extending the support assemblies to raise the chassis into contact with the second application system comprises adjusting the support assemblies to move the chassis to a preselected position.

14. The method of claim 8, further comprising raising the chassis before supporting the first application system with the first fixed support.

15. A vehicle comprising:
   a chassis;
   a plurality of ground-engaging elements configured to support the chassis above a ground surface;
   a plurality of support assemblies supporting the chassis on the ground-engaging elements;
   a plurality of adjustable axles configured to change a lateral distance from the chassis to each of the support assemblies; and
   a controller configured to move the chassis laterally along the axles without changing a track width between ground-engaging elements on opposing sides of the chassis.

16. The vehicle of claim 15,
   wherein the controller is configured to automatically move the chassis laterally along the axles after receiving a command from a user; and
   further comprising a user interface for allowing the user to send the command to the controller.

17. The vehicle of claim 16, wherein the controller is configured to move the chassis laterally while the support assemblies remain stationary.

18. The vehicle of claim 15, further comprising a control panel in communication with the controller, the control panel located at location selected from the group consisting of in an operator cab, on an exterior of the chassis, and in a mobile device.

* * * * *